(12) United States Patent
Schmidt

(10) Patent No.: US 7,274,115 B2
(45) Date of Patent: Sep. 25, 2007

(54) METHOD AND APPARATUS FOR POWERING ELECTRONIC CIRCUITS

(75) Inventor: Konrad Ludwig Josef Schmidt, Nuremberg (DE)

(73) Assignee: Lucent Technologies Inc., Murray Hill, NJ (US)

( * ) Notice: Subject to any disclaimer, the term of this patent is extended or adjusted under 35 U.S.C. 154(b) by 258 days.

(21) Appl. No.: 11/027,904

(22) Filed: Dec. 30, 2004

(65) Prior Publication Data

US 2006/0145629 A1 Jul. 6, 2006

(51) Int. Cl.
*H02J 1/00* (2006.01)
*H02J 7/00* (2006.01)

(52) U.S. Cl. .............................. 307/75; 307/11; 307/65; 307/85

(58) Field of Classification Search ................. 307/75, 307/11, 65; 323/299
See application file for complete search history.

(56) References Cited

U.S. PATENT DOCUMENTS

| | | | | |
|---|---|---|---|---|
| 5,131,040 A | * | 7/1992 | Knapczyk | 380/277 |
| 5,939,801 A | * | 8/1999 | Bouffard et al. | 307/65 |
| 6,057,607 A | * | 5/2000 | Rader et al. | 307/11 |
| 6,064,125 A | * | 5/2000 | Stendardo et al. | 307/64 |
| 6,969,981 B1 | * | 11/2005 | Fairbanks et al. | 323/299 |

* cited by examiner

*Primary Examiner*—Robert L. Deberadinis
*Assistant Examiner*—Tien Mai

(57) ABSTRACT

A method and apparatus for powering an electronic circuit use comparators of supply voltages and voltage regulators to facilitate powering the electronic circuit utilizing more than one supply voltage. In one embodiment, power supplies of step-up power units are controlled using comparators of step-down power units and the step-up power units temporarily provide power to accidentally disabled of step-down power units.

18 Claims, 2 Drawing Sheets

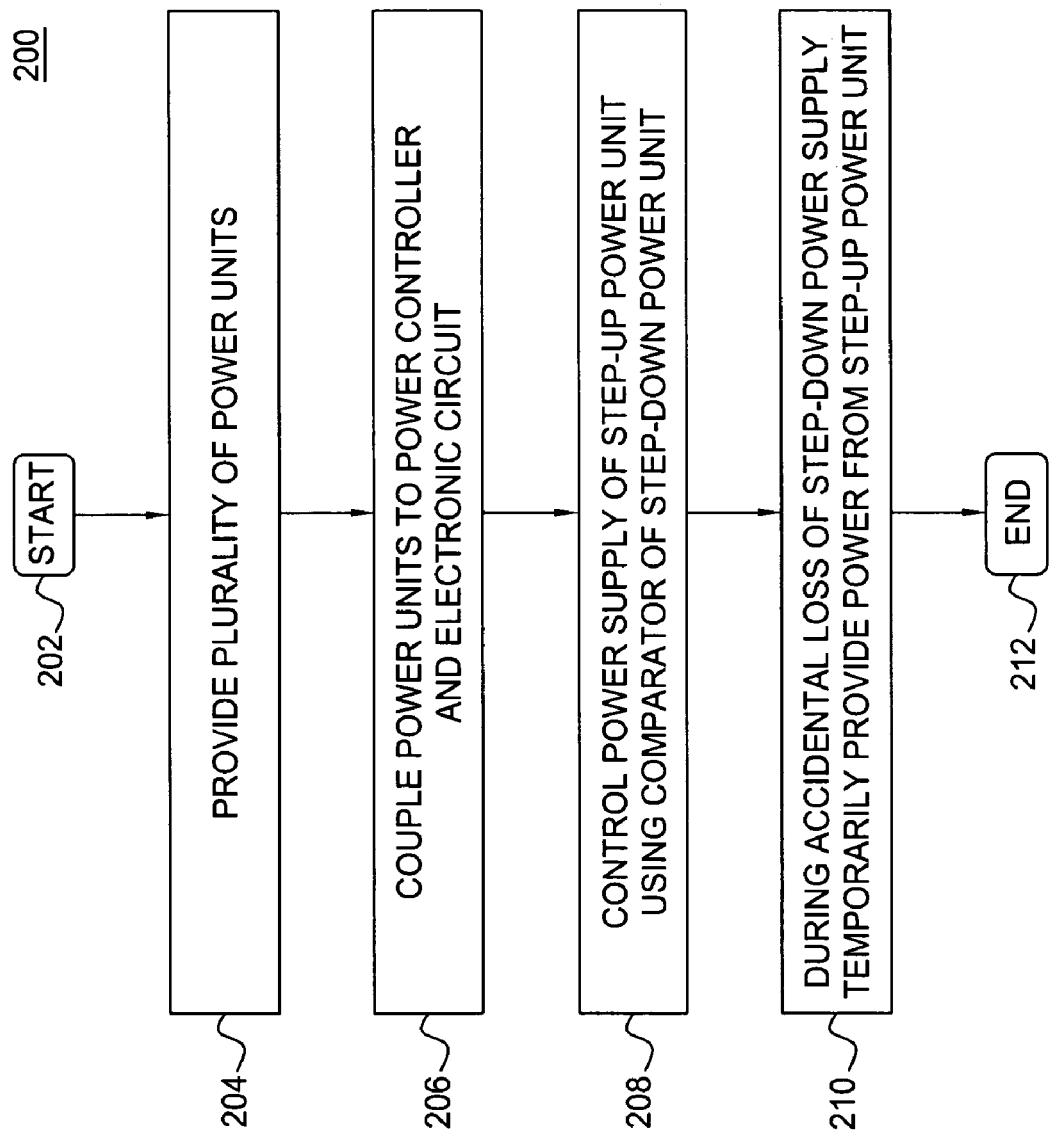

METHOD AND APPARATUS FOR POWERING ELECTRONIC CIRCUITS

FIELD OF THE INVENTION

The invention relates to the field of electronic circuits and, in particular, to a method and apparatus for powering the electronic circuits.

BACKGROUND OF THE INVENTION

Most of integrated electronic circuits (e.g., microprocessors, memory devices, application specific integrated circuits (ASICS), and the like) require several power supplies, where each power supply provides one or more supply voltages. In operation, such voltages should be applied to and removed from the electronic circuits in pre-determined orders, or sequences. Violation of such sequences may result in damaging an electronic circuit.

Conventionally, banks of pre-charged capacitors are used as emergency sources of energy to protect the electronic circuits from accidental loss of a supply voltage as a result of, e.g., a failure of the respective power supply. Such capacitors temporarily substitute for the loss of a supply voltage for the duration of time needed to execute a pre-determined emergency sequence for powering down the affected electronic circuit. However, in advanced electronic circuits using low supply voltages and consuming high supply currents, the number and dimensions of such capacitors become prohibitively large.

Therefore, there is a need in the art for an improved method and apparatus for powering electronic circuits.

SUMMARY OF THE INVENTION

The present invention is a method and apparatus for powering electronic circuits using more than one supply voltage.

In one aspect of the invention, there is provided a method for powering an electronic circuit using a plurality of power units, each unit providing one of supply voltages and including a power supply, a comparator of the supply voltage (i.e., output voltage of the power supply), and a voltage regulator. In one embodiment, the method includes the steps of (i) controlling the power supply of a step-up power unit using the comparator of a step-down power unit and (ii) using the regulator to selectively convert an output voltage of the step-up power unit in an output voltage of the step-down power unit and provide the converted voltage to an output of the step-down power unit. Such a method protects the electronic circuit from damage during accidental failures of the power supplies.

In another aspect of the invention, there is provided an apparatus for powering an electronic circuit that, in operation, executes the inventive method.

BRIEF DESCRIPTION OF THE DRAWINGS

The teachings of the present invention can be readily understood by considering the following detailed description in conjunction with the accompanying drawings, in which:

FIG. 2 depicts a flow diagram of a method for powering an electronic circuit using the apparatus of FIG. 1 in accordance with one embodiment of the present invention.

To facilitate understanding, identical reference numerals have been used, where possible, to designate identical elements that are common to the figures.

Figure 1:
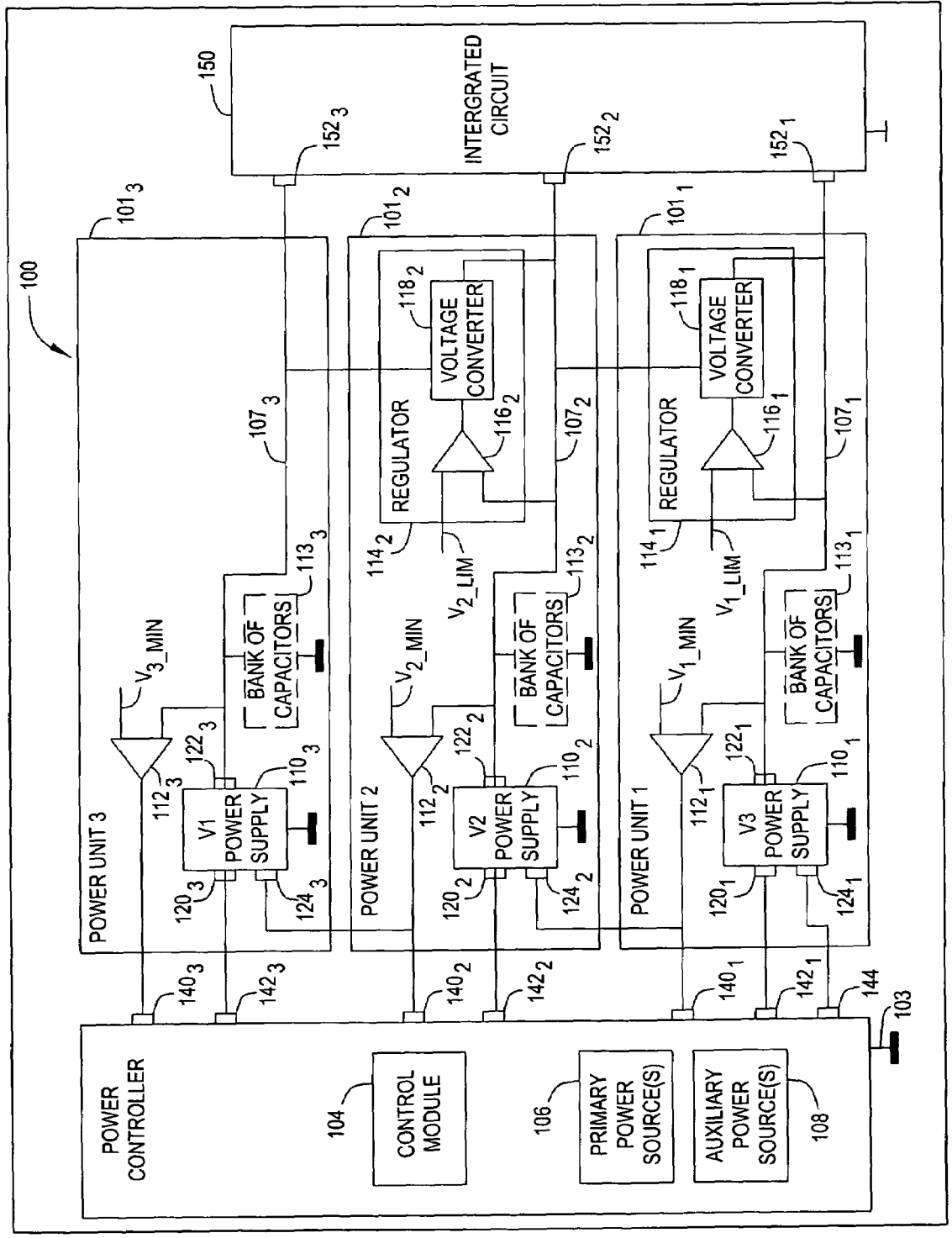
FIG. 1 depicts a schematic diagram of an apparatus for powering an electronic circuit in accordance with one embodiment of the present invention.

It is to be noted, however, that the appended drawings illustrate only exemplary embodiments of this invention and are therefore not to be considered limiting of its scope, for the invention may admit to other equally effective embodiments.

DETAILED DESCRIPTION OF THE INVENTION

The present invention facilitates powering electronic circuits that are using more than one supply voltage and advantageously protects the electronic circuits from damage at accidental losses of power.

FIG. 1 depicts a schematic diagram of an apparatus 100 for powering an electronic circuit 150 in accordance with one embodiment of the present invention. In one embodiment, the apparatus 100 comprises a plurality of power units $101_K$, where K is an integer from 1 to N, and N is equal to the number of supply voltages $V_K$ that are provided to the electronic circuit 150 using the apparatus 100. Herein, similar devices, signals, and properties (e.g., voltages, currents, and the like) are identified using same numeric and alphabetic references, except that the suffixes may be added, when appropriate, to differentiate between the specific devices, signals, and properties. Illustratively, for an example and without limitation, in the depicted embodiment N=3 and $V_1<V_2<V_3$.

In one embodiment, the power unit $101_N$ having the highest output voltage $V_N$ comprises a power supply $110_N$, a comparator $112_N$, and an optional bank $113_N$ of energy-storing capacitors. In the depicted embodiment, a power unit $101_3$ is such power unit having the highest output voltage (i.e., voltage $V_3$).

Each of the power units $110_K$, other than the power unit $101_N$, generally comprises a power supply 110, a comparator 112, a voltage regulator 114, and the optional bank 113 of energy-storing capacitors.

The power units 101 are powered and controlled by a power controller 102 of an electronic system (not shown) that encompasses the electronic circuit 150. Generally, the power controller 102 includes a control module 104, at least one primary power source 106, and at least one auxiliary power source 108. Illustratively, for an example and without limitation, in the depicted embodiment the power controller 102, components of the power units 101, and the electronic circuit 150 are coupled to a common ground terminal 103 of the electronic system.

In operation, the control module 104 facilitates execution of pre-determined sequences for routine and emergency powering up and powering down the apparatus 100 and the electronic circuit 150, as well as monitors if the supply voltages of the power units 101 are within operational limits. Hereafter, the terms "supply voltage" in reference to the electronic circuit 150 and "output voltage" in reference to a power supply 110 or a power unit 101 are used interchangeably. The primary power source(s) 106 and the auxiliary power source(s) 108 (e.g., DC/DC converters, AC/DC converter, and the like) provide power to the power supplies 110 (source 106) and power and references signals (e.g., reference voltages) to comparators 112 and regulators 114 (source 108), respectively.

The power supply 110 is typically a DC/DC converter having a power input terminal 120, a power output terminal 122 coupled to an output rail 107, and an ON/OFF terminal 124. The power input terminal 120 and the output rail 107 are coupled to a respective output 142 of the power controller 102 and a respective input 152 of the electronic circuit 150.

The comparator $112_K$ monitors if the output voltage $V_K$ is within operational limits. A first input of the comparator $112_K$ is coupled to the output rail $107_K$ of the power supply $110_K$ and a second input of the comparator $112_K$ is generally provided with a reference voltage $V_{K\_MIN}$ from the auxiliary power source 108 of the power controller 102. An output of the comparator $110_K$ of a step-down power supply $112_K$ is coupled to the ON/OFF terminal $124_{K+1}$ of a step-up power supply $110_{K+1}$, as well as to terminals $140_K$ of the power controller 102 that are monitored by the control module 104. An output of the comparator of the power supply having the highest output voltage (i.e., power supply $110_3$) and the ON/OFF terminal of the power supply having the smallest output voltage (i.e., power supply $110_3$) are coupled only to the power controller 102.

Herein, the terms "step-down power supply" and "step-up power supply" refer to the power supplies $110_K$ and $110_{K+1}$ having most close output voltages, while the step-down power supply $110_K$ has a smaller output voltage $V_K$ (e.g., $V_1$ or $V_2$) and the step-up power supply $110_{K+1}$ has a greater output voltage $V_{K+1}$ $V_K$ (e.g., $V_2$ or $V_3$, respectively).

The voltage $V_{K\_MIN}$ corresponds to the minimal output voltage of the power unit $101_K$ that is acceptable for powering the electronic circuit 150. Depending on the value of the output voltage $V_K$ relative to the reference voltage $V_{K\_MIN}$ (i.e., if $V_K > V_{K\_MIN}$ or $V_K \leq V_{K\_MIN}$), an output signal of the comparator 112 asserts one of two distinct (i.e., binary) states. In one embodiment, such binary states correspond to logic levels "0" and "1" of control circuits of the power supply 110 and the module 104. Specifically, when $V_K > V_{K\_MIN}$, the comparator $112_K$ sets the step-up power supply to an ON state and, when $V_K \leq V_{K\_MIN}$, the comparator $112_K$ sets the step-up power supply to an OFF state.

The voltage regulator 114 may selectively draw power from the step-up power supply $110_{K+1}$ by coupling to the output of the step-up power supply, converting output voltage $V_{K+1}$ of the power supply $110_{K+1}$ in the voltage $V_{K\_MIN}$, and providing that voltage to the output rail $107_K$ of the step-down power supply $110_K$ and, as such, to the terminal $152_K$ of the electronic circuit 150.

In the depicted embodiment, the voltage regulator $114_1$ may selectively draw power from the power supply $110_2$ and convert the output voltage $V_2$ in the voltage $V_{1\_MIN}$ that is then provided to the terminal $152_1$. Accordingly, the regulator $114_2$ may selectively draw power from the power supply $110_3$ and the convert output voltage $V_3$ in the voltage $V_{2\_MIN}$ that is then provided to the terminal $152_2$.

In one embodiment, the regulator 114 comprises a voltage comparator 116 and an electronically controlled voltage converter 118 (e.g., field effect transistor (FET) based voltage converter, and the like).

The comparator $116_K$ monitors if the output voltage $V_K$ exceeds a pre-determined limit voltage $V_{K\_LIM}$. The limit voltage $V_{K\_LIM}$ is smaller than the reference voltage $V_{K\_MIN}$ and is greater than or at least equal to a minimal output voltage that may cause malfunctioning of or damage to the electronic circuit 150.

A first input of the comparator $116_K$ is coupled to the output rail $107_K$ of the power supply $110_K$ and a second input of the comparator $116_K$ is generally provided with a reference voltage $V_{K\_LIM}$ from the auxiliary power source $108_K$ of the power controller 102. Depending on the value of the output voltage $V_K$ relative to the reference voltage $V_{K\_LIM}$ (i.e., if $V_K > V_{K\_LIM}$ or $V_K \leq V_{K\_LIM}$), an output signal of the comparator 116 asserts one of two distinct (i.e., binary) states. In one embodiment, such binary states correspond to logic levels "0" and "1" of a control circuit of the voltage converter $118_K$.

An output of the comparator $116_K$ is coupled to control input of the voltage converter $118_K$. Specifically, when $V_K > V_{K\_LIM}$, the comparator $116_K$ sets the converter $118_K$ to an open (i.e., non-conducting) state and, when $V_K \leq V_{K\_LIM}$, the comparator $116_K$ sets the converter $118_K$ to convert the output voltage $V_{K+1}$ in the voltage $V_{K\_MIN}$ provided to the output rail $107_K$.

A typical powering up sequence for the electronic circuit 150 requires that supply voltages $V_K$ are applied sequentially, starting with the smaller voltages. In the depicted embodiment, such a sequence corresponds to turning ON the power supplies 110 in the following order: (1) turn ON the power supply $110_1$, (2) turn ON the power supply $110_2$, and (3) turn ON the power supply $110_3$.

In the apparatus 100 during the powering up sequence, when the comparator $112_1$ detects that the output voltage $V_1$ of the power supply $110_1$ has reached the minimal operational voltage $V_{1\_MIN}$, the comparator turns ON the power supply $110_2$. Similarly, when the comparator $112_2$ detects that the output voltage $V_2$ of the power supply $110_2$ has reached the minimal operational voltage $V_{2\_MIN}$, the comparator turns ON the power supply $110_3$.

A typical powering down sequence for the electronic circuit 150 requires that the supply voltages $V_K$ are removed sequentially, starting with the highest applied voltage. In the depicted embodiment, such a sequence corresponds to turning OFF the power supplies in the following order: (1) turn OFF the power supply $110_3$, (2) turn OFF the power supply $110_2$, and (3) turn OFF the power supply $110_1$.

When, in operation, a power supply $110_M$ accidentally turns OFF or becomes disabled, the voltage regulator $114_M$ selectively draws power from the step-up power supply $110_{M+1}$, converts the output voltage $V_{M+1}$ of the power supply $110_{M+1}$ in the voltage $V_{M\_MIN}$, and provides that voltage to the output rail of the power supply $110_M$, where M is an integer from 1 to N−1. When both power supplies $110_M$ and $110_{M+1}$ accidentally turn OFF or become disabled, the voltage regulators $114_M$ and $114_{M+1}$ similarly provide conversions of the power of the power supply having a higher voltage $V_{M+2}$ (in the depicted embodiment, voltage $V_3$) in the minimal operational voltages of the power supplies $110_M$ and $110_{M+1}$.

In the case that the voltage converters 118 are step-down or linear (i.e., drop-down) regulators, it is beneficial to keep their drop voltages low in order to maintain, at the terminals $152_K$, output voltages close to the defined minimal values $V_{K\_LIM}$.

Such power conversion continues for a duration of time that is sufficient for the power controller 102 to detect the loss of power by a respective power supply and activate emergency powering down sequences and procedures that assure operability of the electronic circuit 150. Alternatively, the comparators 112 and voltage regulators 114 of the apparatus 100 may facilitate disabling of the step-up power supplies before the power controller 102 activates such emergency sequences and procedures.

FIG. 2 depicts a flow diagram of one embodiment of the inventive method for powering electronic circuits using the apparatus of FIG. 1 as a process 200. For best understanding of this embodiment of the invention, the reader should refer simultaneously to FIGS. 1-2.

The process 200 starts at step 202 and proceeds to step 204. At step 204, the apparatus 100 comprising a plurality of the power units 101 is provided. At step 206, the power units 101 are coupled to the power controller 102 and the electronic circuit 150 is powered using the apparatus 100.

At step 208, the powering up sequence is facilitated by controlling the step-up power supplies using comparators 112 of the step-down power supplies, as discussed above in reference to FIG. 1. Specifically, a step-up power supply is enabled (i.e., turned ON) when the output voltage of the step-down power supply exceeds the minimal operational limit for the output voltage of that step-down power supply.

At step 210, the apparatus 100 powers the electronic circuit 150. During accidental loss of power by a power supply other than the power supply having the highest output voltage (i.e., power supply $110_N$), the voltage regulator 114 of the affected power supply (e.g., power supply $110_1$) draws power from the step-up power supply (e.g., power supply $110_2$) to maintain the limit voltage of the affected power supply (e.g., limit voltage $V_{1\_LIM}$). In one embodiment, step 210 may continue until the power controller 102 activates the emergency recovery sequences and procedures. In an alternate embodiment, the apparatus 100 facilitates disabling of the power supplies that have output voltages greater than the output voltage of the affected power supply before the power controller 102 activates the such sequences and procedures. At step 212, the process 200 ends.

The invention is described above as using specific functions and devices. It will be appreciated by those skilled in the art that a large number of functions and devices that may alternatively be employed, either individually or in combination, to achieve the objects of the invention described herein are within the scope of the invention.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method for powering an electronic circuit, comprising:
   (a) providing a plurality of power units, each power unit supplying an output voltage to the electronic circuit, the plurality including:
      a power unit having the highest output voltage, comprising:
         a power supply; and
         a comparator of an output voltage of the power supply; and
      voltage step-up and step-down power units, each comprising:
         a power supply;
         a comparator of an output voltage of the power supply; and
         a voltage regulator;
   (b) controlling the power supply of the step-up power unit using the comparator of the step-down power unit; and
   (c) selectively converting an output voltage of the step-up power unit into an output voltage of the step-down power unit using the regulator of the step-down power unit and providing the converted voltage to an output of the step-down power unit.

2. The method of claim 1 wherein the electronic circuit is a digital, analog, or mixed signal electronic circuit using more than one supply voltage.

3. The method of claim 1 wherein the step (b) further comprises:
   applying to a first input of the comparator of the step-down power unit an output voltage of the step-down power unit;
   applying to a second input of the comparator of the step-down power unit a first reference voltage that is equal to or greater than a minimal operational output voltage of the step-down power unit;
   coupling an output of the comparator of the step-down power unit to an ON/OFF terminal of the power supply of the step-up power unit; and
   switching off the power supply of the step-up power unit when the output voltage of the step-down power unit is smaller than the minimal operational output voltage of the step-down power unit.

4. The method of claim 1 wherein the respective voltage regulators of the step-up power unit and the step-down power unit each comprise a network including a voltage comparator and a voltage converter.

5. The method of claim 4 further comprising for at least one of the step-up power unit and the step-down power unit:
   applying to a first input of the voltage comparator of the power unit an output voltage of the power unit;
   applying to a second input of the voltage comparator of the power unit a second reference voltage that is smaller by a predetermined margin than a minimal operational output voltage of the power unit;
   coupling an output of the voltage comparator of the power unit to a control input of the voltage converter of the power unit; and
   enabling the voltage converter when the second reference voltage is greater than the output voltage.

6. The method of claim 1 wherein at least one of the power supplies is a DC/DC converter.

7. The method of claim 1 wherein at least one of the power units further comprises at least one capacitor coupled to an output of the power unit.

8. An apparatus for powering an electronic circuit, comprising:
   a plurality of power units, each power unit supplying an output voltage to the electronic circuit, the plurality including:
      a power unit having the highest output voltage, comprising:
         a power supply; and
         a comparator of an output voltage of the power supply; and
      voltage step-up and step-down power units, each comprising:
         a power supply;
         a comparator of an output voltage of the power supply; and
         a voltage regulator,
   wherein the comparator of the step-down power unit controls the power supply of the step-up power unit; and the regulator of the step-down power unit selectively converts an output voltage of the step-up power unit into an output voltage of the step-down power unit and provides the converted voltage to an output of the step-down power unit.

9. The apparatus of claim 8 wherein the electronic circuit is a digital, analog, or mixed signal electronic circuit using more than one supply voltage.

10. The apparatus of claim 9 wherein at least one of the power supplies is a DC/DC converter.

11. The apparatus of claim 8 wherein:
a first input of the comparator of the step-down power unit is coupled to an output of the step-down power unit;
a second input of the comparator of the step-down power unit is coupled to a source of a first reference voltage; and
an output of the comparator of the step-down power unit is coupled to an ON/OFF terminal of the power supply of the step-up power unit.

12. The apparatus of claim 11 wherein the first reference voltage is equal to or greater than a minimal operational output voltage of the step-down power unit.

13. The apparatus of claim 8 wherein the comparator of the step-down power unit switches off the power supply of the step-up power unit when the output voltage of the step-down power unit is smaller than a minimal operational output voltage of the step-down power unit.

14. The apparatus of claim 8 wherein the voltage regulators of the step-up power unit and the step-down power unit each comprise a network including a voltage comparator and a voltage converter.

15. The apparatus of claim 14 wherein for at least one of the step-up power unit and the step-down power unit:
a first input of the voltage comparator of the power unit is coupled to an output of the power unit;
a second input of the voltage comparator of the power unit is coupled to a source of a second reference voltage; and
an output of the voltage comparator is coupled to a control input of the voltage converter of the power unit.

16. The apparatus of claim 15 wherein the second reference voltage is smaller by a predetermined margin than a minimal operational output voltage of the power unit.

17. The apparatus of claim 15 wherein the voltage provided by the regulator of the power unit is equal to or greater than the minimal operational voltage of the step-down power unit.

18. The apparatus of claim 8 wherein at least one of the power units further comprises at least one capacitor coupled to an output of the power unit.

\* \* \* \* \*